United States Patent
Thomas

(10) Patent No.: US 8,540,154 B2
(45) Date of Patent: *Sep. 24, 2013

(54) SYSTEM AND METHOD FOR REGISTRATION OF AN ELECTRONIC DEVICE

(75) Inventor: Theodosios Thomas, Apex, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,617

(22) Filed: Aug. 24, 2012

(65) Prior Publication Data

US 2012/0323709 A1 Dec. 20, 2012

Related U.S. Application Data

(63) Continuation of application No. 12/729,391, filed on Mar. 23, 2010, now Pat. No. 8,272,568, which is a continuation of application No. 11/388,510, filed on Mar. 24, 2006, now Pat. No. 7,712,661.

(51) Int. Cl.
  *G06K 15/00* (2006.01)
  *G06Q 10/00* (2012.01)

(52) U.S. Cl.
  USPC .............................. 235/383; 705/24; 705/302

(58) Field of Classification Search
  USPC ........................................ 235/383; 705/24, 1
  See application file for complete search history.

(56) References Cited

U.S. PATENT DOCUMENTS

| | | | |
|---|---|---|---|
| 5,978,774 A | 11/1999 | Rogers et al. | |
| 6,018,719 A | 1/2000 | Rogers et al. | |
| 6,757,663 B1 | 6/2004 | Rogers | |
| 7,712,661 B2 * | 5/2010 | Thomas | 235/383 |
| 8,272,568 B2 * | 9/2012 | Thomas | 235/383 |
| 2001/0029483 A1 | 10/2001 | Schultz et al. | |
| 2001/0042022 A1 | 11/2001 | Kirkpatrick et al. | |
| 2001/0053980 A1 | 12/2001 | Suliman, Jr. et al. | |
| 2002/0128851 A1 | 9/2002 | Chefalas et al. | |
| 2003/0004737 A1 | 1/2003 | Conquest et al. | |
| 2003/0018578 A1 | 1/2003 | Schultz | |
| 2003/0069750 A1 | 4/2003 | Siegel et al. | |
| 2003/0149573 A1 | 8/2003 | Lynton | |
| 2004/0006514 A1 | 1/2004 | Rogers et al. | |
| 2004/0255115 A1 | 12/2004 | DeMello et al. | |
| 2005/0060266 A1 | 3/2005 | DeMello et al. | |
| 2005/0114166 A1 | 5/2005 | Nishimura et al. | |

OTHER PUBLICATIONS

Brain, M., et al., "How Cell Phones Work." Nov. 14, 2000. HowStuffWorks.com. <http://electronics.howstuffworks.com/cell-phone.htm>, 4 pages.

* cited by examiner

*Primary Examiner* — Daniel Hess

(57) ABSTRACT

A method for registering an electronic device includes receiving a transaction code and purchaser information associated with a purchase of an electronic device. While the transaction code is associated with the purchase of the electronic device, it does not uniquely identify the electronic device purchased. The method also includes receiving from the electronic device the transaction code and a device identifier that uniquely identifies the electronic device. The device is registered by associating the purchaser information and the device identifier via the transaction code.

20 Claims, 5 Drawing Sheets

SYSTEM AND METHOD FOR REGISTRATION OF AN ELECTRONIC DEVICE

RELATED APPLICATIONS

This application is a continuation of U.S. patent application Ser. No. 12/729,391 titled, "SYSTEM AND METHOD FOR REGISTRATION OF AN ELECTRONIC DEVICE," filed Mar. 23, 2010, which is a continuation of U.S. patent application Ser. No. 11/388,510 titled, "SYSTEM AND METHOD FOR REGISTRATION OF AN ELECTRONIC DEVICE," filed Mar. 24, 2006, which are commonly owned with this application, the entire disclosure of which are here incorporated by reference.

BACKGROUND

Consumers have the flexibility to purchase electronic devices in the comfort of their homes by logging on to any one of hundreds of online retailers, selecting an electronic device, and providing payment information, such as a credit card number, to the retailer to purchase the electronic device. For those who prefer to see and hold the electronic device or who do not have access to online retailers, the option of visiting a store to purchase the electronic device is typically available. In either instance, the consumer eventually receives the electronic device and is typically asked to register with a manufacturer of the device. The registration process usually requires the purchaser to complete and mail back to the manufacturer a postcard that includes registration information, e.g., the purchaser's name and address, and the device's serial number and model number. Alternatively, the purchaser can log on to a registration webpage provided by the manufacturer and provide the registration information.

For manufacturers and purchasers, device registration is an important and useful process. By registering the device, the purchaser can receive from the manufacturer upgrades, recall notices, safety warnings, and other pertinent information related to the device. In addition, if the purchaser has questions regarding the device, the manufacturer can quickly determine the make and model of the device and provide prompt customer support. The manufacturer can easily determine whether a defective device is under warranty based on the registration information and also can develop cross-selling strategies to increase its sales revenue.

Nevertheless, for a number of reasons, purchasers frequently do not take the time to register their devices with manufacturers. For instance, some purchasers are reluctant to provide personal information for fear that the information will be misappropriated, e.g., sold to third party vendors. Some purchasers are simply too busy to register. As a result, the manufacturer cannot track the device to the purchaser and cannot provide beneficial information and services to the purchaser, and the purchaser cannot receive upgrades and information related to the device. In many cases, warranties on the devices are not activated.

Several processes have been implemented to try to improve the rate of device registration. Some processes focus on device registration at the point-of-sale, e.g., the store, when the device is purchased. For example, some manufacturers provide barcodes on each electronic device that identify the make/model and serial number of the device so that an employee of the retail store can scan the barcodes when the device is purchased and send the registration information to the manufacturer. These processes, however, can be cumbersome and time-consuming because the employee is required to locate the barcodes, which are often on the device itself inside of packaging. In this case, the employee must remove the device from its packaging before he or she can scan the barcodes.

Moreover, these processes are not generally feasible for online retailers, particularly for those retailers who serve as general distributors or clearinghouses for several other retailers. In this instance, the online retailer typically facilitates the online transaction, and then hours, or more commonly, days later, the device is delivered from a warehouse to the purchaser. The online retailer does not have physical access to the device purchased, and therefore collecting the registration information at the point-of-sale is virtually impossible.

SUMMARY

Accordingly, methods and systems for registering an electronic device are described. According to one exemplary embodiment, a method for registering an electronic device includes receiving from a point-of-sale interface a transaction code and purchaser information associated with a purchase of an electronic device. While the transaction code is associated with the purchase of the electronic device, it does not uniquely identify the electronic device purchased. The method also includes receiving from the electronic device the transaction code and a device identifier that uniquely identifies the electronic device. The purchaser information and the device identifier are associated via the transaction code for registering the electronic device.

According to another exemplary embodiment, a method for registering an electronic device includes receiving a transaction code associated with a purchase of an electronic device that does not uniquely identify the electronic device. The transaction code associates purchaser information with the purchase of the electronic device. The transaction code and a device identifier that uniquely identifies the electronic device is sent from the electronic device to a registration server system for associating the purchaser information with the device identifier via the transaction code to register the electronic device.

According to another exemplary embodiment, a system for registering an electronic device includes a server system that includes a network interface for communicating over a network and a registration service module. The registration service module is configured to receive from a point-of-sale interface a transaction code and purchaser information associated with a purchase of an electronic device. While the transaction code is associated with the purchase, it does not uniquely identify the electronic device purchased. The registration service module is also configured to receive from the electronic device the transaction code and a device identifier uniquely identifying the electronic device, and to associate the purchaser information with the device identifier via the transaction code for registering the electronic device.

According to yet another exemplary embodiment, an electronic device includes a user interface for allowing a purchaser to enter a transaction code associated with a purchase of an electronic device that does not uniquely identify the electronic device and a device correlator component configured to create a message that includes the transaction code and a device identifier uniquely identifying the electronic device. The electronic device also includes a communication interface for establishing a network connection between the electronic device and a registration server system and for sending the message to the registration server system, wherein purchaser information is associated with the device identifier via the transaction code to register the electronic device.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

According to an exemplary embodiment, a transaction code associated with a purchase of an electronic device is used to register the electronic device. In one embodiment, when an electronic device is purchased either in person or online, the retailer retrieves information related to the purchaser, e.g., the purchaser's name, billing address, and credit card number, and associates a transaction code with the purchase and the purchaser information. The transaction code is associated with the purchase and notably does not uniquely identify the electronic device purchased. The retailer then issues the transaction code to the purchaser of the electronic device. At a later time, e.g., when the purchaser uses the electronic device for the first time, the purchaser can register the device by entering the transaction code into the electronic device. The electronic device then automatically sends the transaction code and a device identifier to a registration server system, which then uses the transaction code to correlate the device identifier with the purchaser information received from the retailer.

In this manner, device registration is significantly simplified and streamlined. For the purchaser, the purchaser need only enter the transaction code and is not required to manually fill out and return postcards or go to web pages to submit personal information. For the retailer, the purchaser's personal information is normally retrieved when the purchaser uses a credit card or other electronic means to purchase the device. The transaction code can be any random alphanumeric pattern and because the transaction code is not uniquely associated with the device, the retailer need not correlate the transaction code with a unique device identifier, e.g., the serial number. By simplifying the registration process in this way, more purchasers will be encouraged to register their devices.

Figure 1:
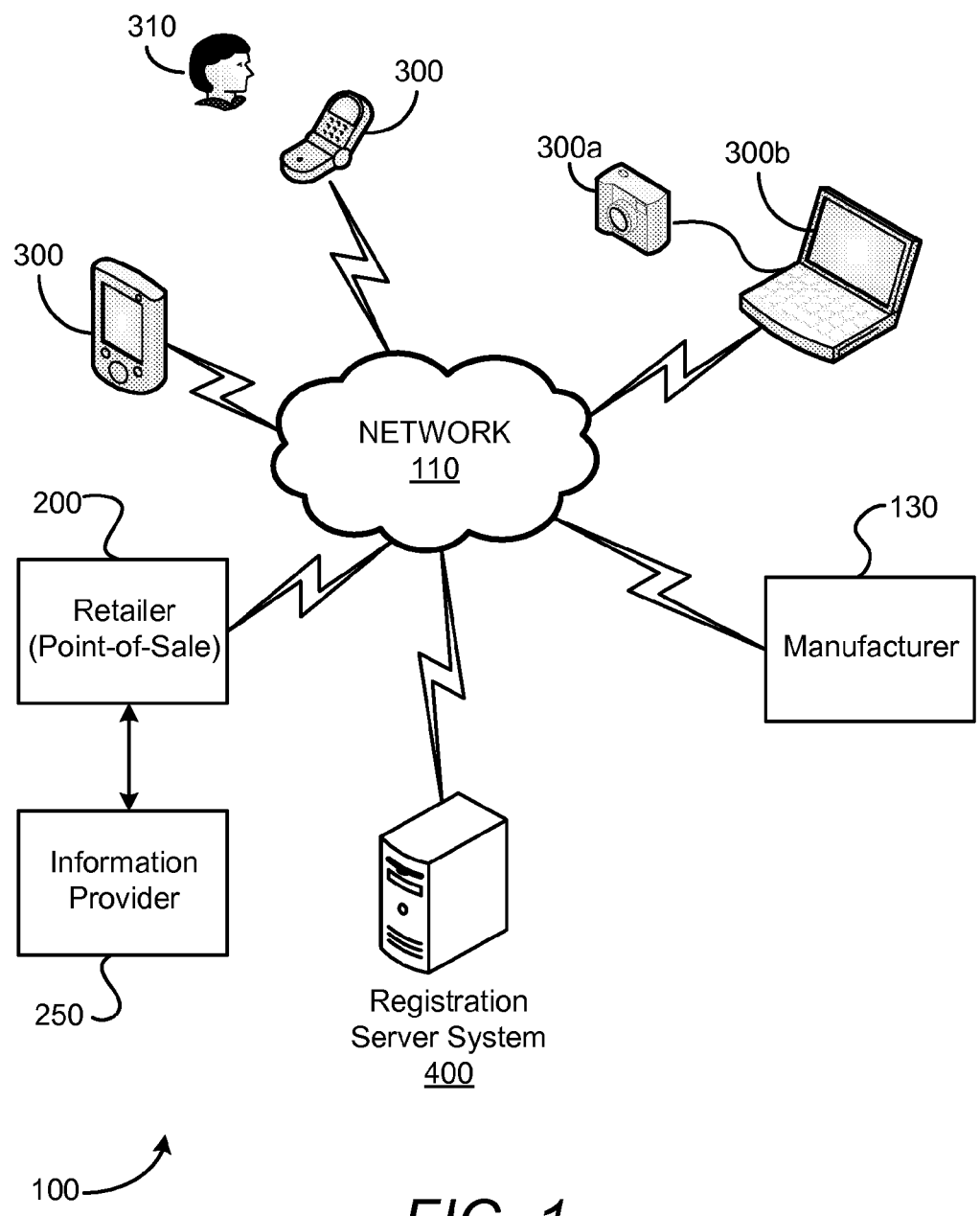
FIG. 1 is a block diagram illustrating an exemplary system for registering an electronic device according to an exemplary embodiment.

FIG. 1 is block diagram illustrating an exemplary system for registering an electronic device according to an exemplary embodiment. The system 100 includes a retailer 200 (also referred to as a "point-of-sale"), a plurality of electronic devices 300, and a registration server system 400. The retailer 200, devices 300, and registration server 400 are communicatively coupled by a network 110, such as the internet. The retailer or point-of-sale (POS) 200 is an entity from which a purchaser 310 purchases an electronic device 300. In one embodiment, the POS 200 can be a brick-and-mortar store that stocks the electronic device 300 on site. Here, the purchaser 310 can enter the store, inspect and buy the electronic device 300, and leave the store with the purchased electronic device 300. In another embodiment, the POS 200 can be a virtual, i.e., online, store. Here, the purchaser 310 can view, select and purchase an electronic device using a web browser on his or her home computer system. The purchased electronic device 300 is then delivered to the purchaser 310 via a third party distributor.

As is shown in FIG. 1, the POS 200 is typically in communication with an information provider 250 for providing personal information relating to a purchaser 310. For example, the information provider 250 can be a bank, credit bureau, or credit card company that is capable of verifying the purchaser's payment information. In addition, the information provider 250 can be the purchaser 310 herself. The information provider 250 typically stores personal information relating to the purchaser 310 such as the purchaser's name, billing address and telephone number.

Figure 2:
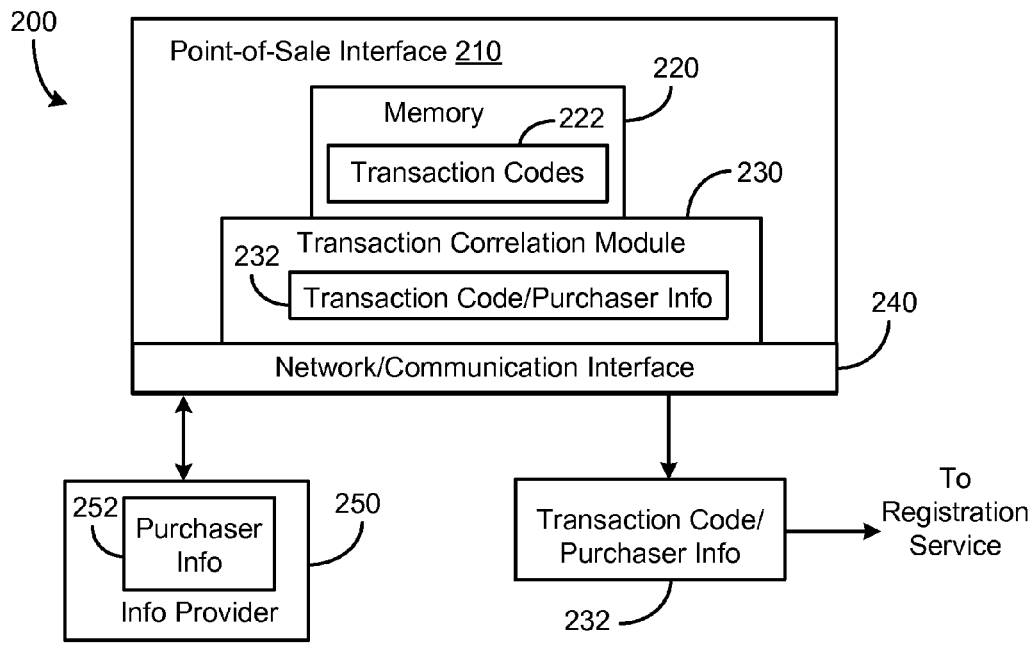
FIG. 2 is a block diagram illustrating an exemplary point-of-sale according to an exemplary embodiment.

FIG. 2 is a block diagram illustrating an exemplary POS 200 according to one embodiment. The POS 200 includes a point-of-sale interface 210, such as a computer check-out terminal (in a brick-and-mortar store), or a web server for an online retailer. The POS interface 210 includes means for communicating with the information provider 250 and for communicating with the registration server system 400 over the network 110. For example, the POS interface 210 can include a network/communication interface 240 for communicating with the information provider 250 and for establishing a network connection between the POS 200 and the registration server system 400.

In an exemplary embodiment, the POS interface 210 includes memory 220 for storing a plurality of transaction codes 222. Each transaction code 222 is different and can comprise a random arrangement of alphanumeric characters. In one embodiment, the transaction code 222 can include information about the POS 200, such as its location and name. For example, the transaction code 222 can include a prefix that identifies the POS 200 and its location. In addition, or alternatively, the transaction code 222 can include a prefix that identifies date and/or time information for the transaction. In one implementation, the transaction code 222 and memory 220 can be located remotely from the point-of-sale interface 210 and retrieved via the network 110 or a local area network (not shown) as needed.

The POS interface 210 also includes a transaction correlation module 230 that is configured to retrieve a transaction code 222 from memory 220 when a purchaser 310 buys an electronic device 300. The transaction code 222 is associated with the purchase of the electronic device 300 and is provided to the purchaser 310 in connection with the purchase. In one embodiment, the transaction correlation module 230 can print the transaction code 222 on a receipt and provide the receipt to the purchaser 310. In another embodiment, the transaction correlation module 230 can place the transaction code 222 in a confirmation email or webpage sent to the purchaser 310 to confirm the purchase.

In addition, the transaction correlation module 230 is configured to retrieve personal information relating to the purchaser 310 of the electronic device 300, such as the purchaser's name, billing address and telephone number from the information provider 250. This personal information, referred to as purchaser information 252, is then linked to the transaction code 222 to form a transaction code/purchaser information pair 232. In an exemplary embodiment, the transaction correlation module 230 is configured to form a message that includes the transaction code/purchaser information pair 232 and optionally a date of purchase and/or other transaction-related information, and to send the message to the registration server system 400 via the network 110.

As stated above, the purchaser 310 receives the transaction code 222 associated with the purchase of the electronic device 300 in connection with the purchase. In one exemplary embodiment, the purchaser 310 can use the transaction code 222 to register the electronic device 300. Referring again to FIG. 1, the electronic device 300 can be a PDA, a mobile telephone, a digital camera, a desktop or laptop computer, and the like. Some devices 300 can be network enabled such that the device 300 is configured to connect directly to the network 110. Other devices 300 can communicate over the network 110 by connecting to a network enabled device 300, e.g., via a USB cable. For example, as is shown in FIG. 1, the digital camera 300*a* can be configured to connect to a network enabled laptop computer 300*b* in order to connect to the network 110. According to an exemplary embodiment, the electronic device 300 can be used to send the transaction code 222 to the registration server system 400 to register the electronic device 300.

Figure 3:
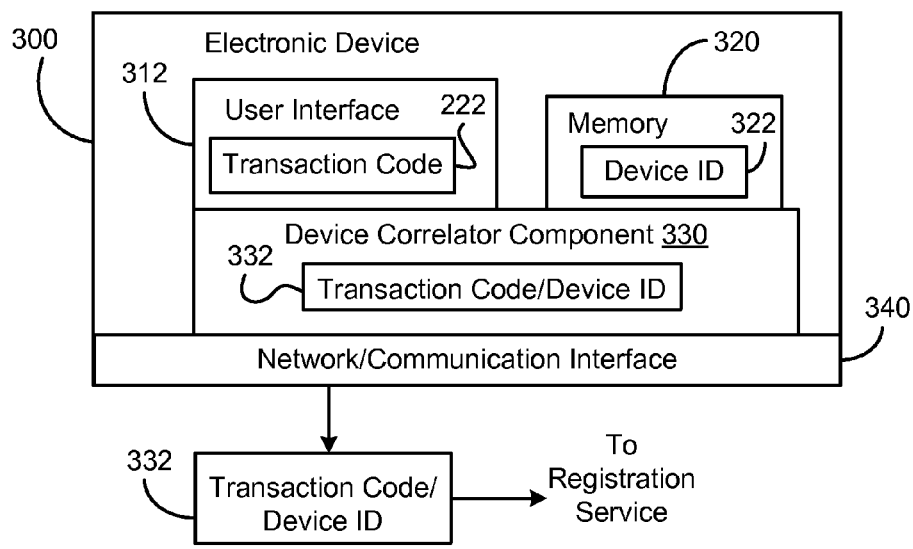
FIG. 3 is a block diagram illustrating an exemplary electronic device according to an exemplary embodiment.

FIG. 3 is a block diagram illustrating an exemplary electronic device 300 according to one embodiment. The electronic device 300 includes a means for receiving the transaction code 222 associated with the purchase of the electronic device. For example, the electronic device 300 can provide a user interface 312 that prompts the purchaser 310 to enter the transaction code 222 using a data entry mechanism (not shown), such as a keypad or a touchpad. In one embodiment, the user interface 312 prompts the purchaser 310 for the transaction code 222 when the purchaser 310 initializes the electronic device or when the purchaser 310 uses the device for the first time, and may prevent or limit further use until the transaction code 222 is entered. In another embodiment, the user interface 312 can remind the purchaser 310 to enter the transaction code 222 periodically until the transaction code 222 is entered.

According to an exemplary embodiment, the electronic device 300 further includes a means for linking the transaction code 222 with a device identifier 322 that uniquely identifies the electronic device 300 and for forming a transaction code/device identifier pair 332. For example, the electronic device 300 can include a device correlator component 330 that is configured to receive the transaction code 222 from the user interface 312 and to associate it with the device identifier 322. In one embodiment, the device identifier 322 is stored in a storage mechanism 320, such as nonvolatile programmable memory commonly used to store system configuration settings and the like. The device correlator component 230 is configured to retrieve automatically the device identifier 322 from the storage mechanism 320 and to create a message that includes the transaction code/device identifier pair 332. In one implementation, the device identifier 322 can be received from a user via the user interface 312.

According to an exemplary embodiment, the electronic device 300 includes a means for sending the message that includes the transaction code/device identifier pair 332 to the registration server system 400. For example, the electronic device 300 can include a network/communication interface 340 for establishing a network connection between the electronic device 300 and the registration server system 400 for sending transaction code/device identifier pair 332 to the registration server system 400.

In an exemplary embodiment, the registration server system 400 receives the transaction code/device identifier pair 332 from the electronic device 300 and the transaction code/purchaser information pair 232 from the POS 200 via the network 110. The registration server system 400 then uses the transaction code 222 to associate the purchaser information 252 with the device identifier 322, thereby registering the electronic device 300.

Figure 4:
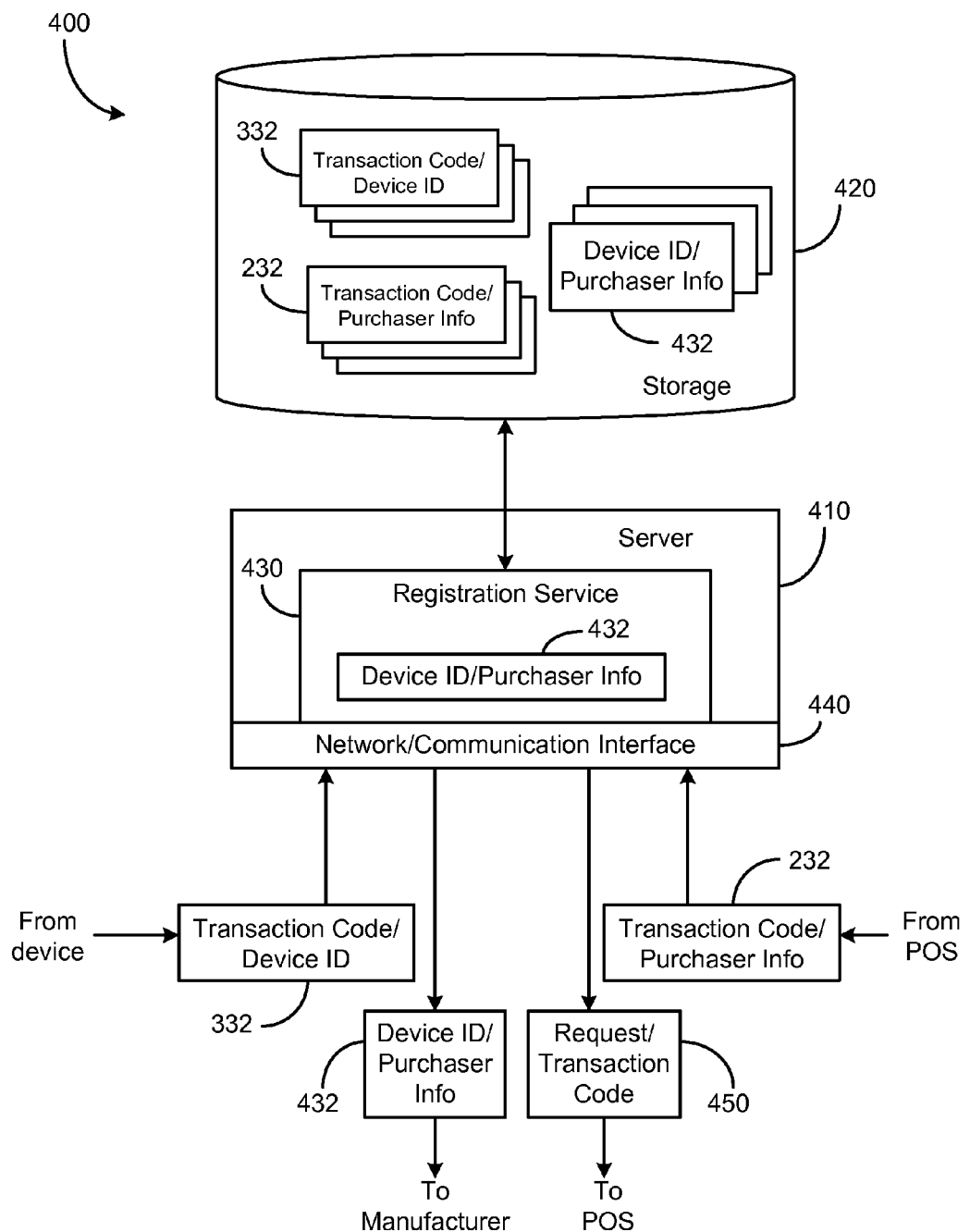
FIG. 4 is a block diagram illustrating an exemplary registration server system according to an exemplary embodiment.

FIG. 4 is a block diagram illustrating an exemplary registration server system 400 according to one embodiment. The registration server system 400 comprises a server 410 that comprises means for receiving messages that include the transaction code/device identifier pair 332 and the transaction code/purchaser information pair 232 from the electronic device 300 and POS 200, respectively. For example, the server 410 can include a network/communication interface 440 for establishing a network connection between the server 410 and the electronic device 300 and POS 200.

The server 410 also includes a means for associating the purchaser information 252 with the device identifier 322 via the transaction code 222. For example, the server 410 can include a registration service module 430 that is configured to receive and parse the transaction code/device identifier pair 332 and the transaction code/purchaser information pair 232 and to form a device identifier/purchaser information pair 432. In one embodiment, the registration service module 430 can store at least one of the pairs 232, 332, 432 in a data storage mechanism 420, such as a database, coupled to the server 410 so that the registration service module 430 can retrieve any pair 232, 332, 432 as needed or upon request.

In one embodiment, after the device identifier/purchaser information pair 432 is formed and the electronic device 300 is registered, the registration service module 430 can remove the transaction code pairs 232, 332 from the database 420 and return the transaction code 222 to the POS 200 so that the transaction code 222 can be reused for another purchase. Because the transaction code 222 can be recycled after the electronic device 300 is registered, fewer total transaction codes 222 are needed. Thus, unlike a serial number for an electronic device, the transaction code 222 can contain fewer characters and can be less complicated. For example, if a POS 200 processes 1000 transactions per week, and the average registration period is one week, then the POS 200 might need approximately 1000 different transaction codes 222. In this scenario, the transaction code 222 may only need to be three characters long for a purely numeric transaction code 222, or two characters long for a purely alphabetic (upper and lower case) or for an alphanumeric transaction code 222, thus making it easier for the purchaser 310 to enter it into the electronic device 300. Of course longer transaction codes 222 can be employed nevertheless to provide extended registration periods or simply to lessen the likelihood of incorrect registrations.

Although not shown in FIG. 4, the registration server system 400 can include more than one server 410. In an exemplary embodiment, the registration server system 400 can include a server 410 that acts as an independent registration authority that processes registrations for a plurality of manufacturers 130 (FIG. 1). In this case, the server 410 can be configured to send the device identifier/purchaser information pair 430 to a manufacturer 130 of the electronic device 300 so that the manufacturer 130 can register the device 300. In another embodiment, the registration server system 400 can include a server 410 that is managed by the manufacturer 130 such that the server 410 is used to register devices 300 produced by the manufacturer 130. In this case, the device identifier/purchaser information pair 432 can be stored in the database 420.

Figure 5:
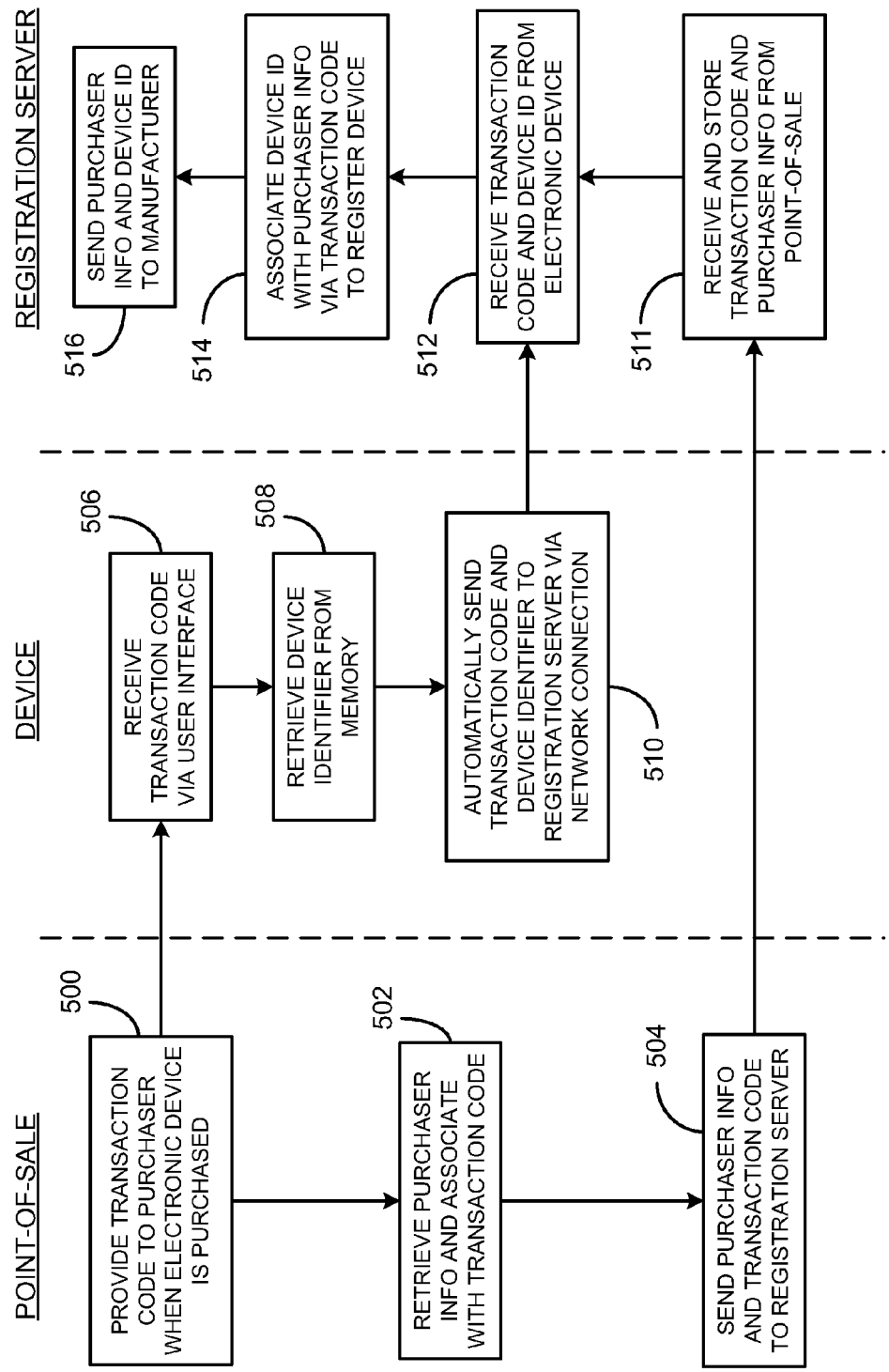
FIG. 5 is a flow diagram illustrating an exemplary process for registering an electronic device according to an exemplary embodiment.

FIG. 5 is a flow diagram illustrating an exemplary process for registering an electronic device 300 according to one embodiment. Referring to FIGS. 1-5, the exemplary process begins at the POS 200 where the transaction code is provided to the purchaser 310 when an electronic device 300 is purchased (block 500). As stated above, the transaction code 222 can be provided to the purchaser 310 in a number of ways, including but not limited to, printing the transaction code 222 on a paper receipt that is given to the purchaser 310, serving a webpage with the transaction code 222 to the purchaser's web browser, or sending an email with the transaction code 222 to the purchaser's email address.

In an exemplary embodiment, the POS 200 also retrieves or collects purchaser information 252 from the information provider 250 and associates the purchaser information 252 with the transaction code 222 (block 502). In one embodiment, the purchaser information 252 can be retrieved from a financial institution, such as a credit card company or bank when the purchaser 310 uses a credit card or personal check to buy the electronic device 300. In addition, or alternatively, the purchaser information 252 can be provided directly by the purchaser 310. Once the purchase is complete, the POS 200 can send, via the network 110, the purchaser information 252 and the associated transaction code 222 to the registration server system 400 (block 504), where it is received and stored (block 511).

In the meantime, the purchaser 310 has received the transaction code 222 in connection with the purchase. When the purchaser 310 wishes to register the electronic device 300, the purchaser can enter the transaction code 222 into the electronic device 300 via the user interface 312. Accordingly, at the device, the transaction code 222 is received via the user interface 312 (block 508). In one embodiment, the purchaser 310 is required to enter the transaction code 222 before using the electronic device 300 for a first time. In this case, the user interface 312 can prompt the purchaser 310 to enter the transaction code 222 in order to initialize the electronic device 300. In another embodiment, the user interface 312 can give the purchaser 310 the option of entering the transaction code 222 when the electronic device 300 is used.

After the transaction code 222 is received via the user interface 312, the device correlator component 330 can automatically retrieve the device identifier 322 from the storage mechanism 320 (block 508) and send the transaction code 222 and the device identifier 322 to the registration server system 400 via the network 110 (block 510). In one embodiment, the device correlator component 330 creates a message that includes the transaction code 222 and the device identifier 322, uses the network/communication interface 340 to establish a network connection between the electronic device 300 and the registration server system 400, and sends the message to the registration server system 400 over the network connection. In another embodiment, the network/communication interface 340 is configured to establish a communication channel between the electronic device 300 and another computer system that is capable of connecting to the network 110, and the computer system is used to establish the network connection between the electronic device 300 and the registration server system 400. In this case, the electronic device 300 can store the transaction code/device identifier pair 332 and send pair 332 when a network connection is established.

At the registration server system 400, the server 410 receives and stores the transaction code/purchaser information pair 232 (block 511) in connection with the purchase. When the server 410 receives the transaction code/device identifier pair 332 from the electronic device 300 (block 512), it retrieves the corresponding transaction code/purchaser information pair from storage 420 and associates the device identifier 322 with the purchaser information 252 to register the device 300 (block 514). In one embodiment, the device identifier/purchaser information pair 432 can be sent to a manufacturer 130 (block 516) for registration, and/or stored in the database 420.

Figure 6:
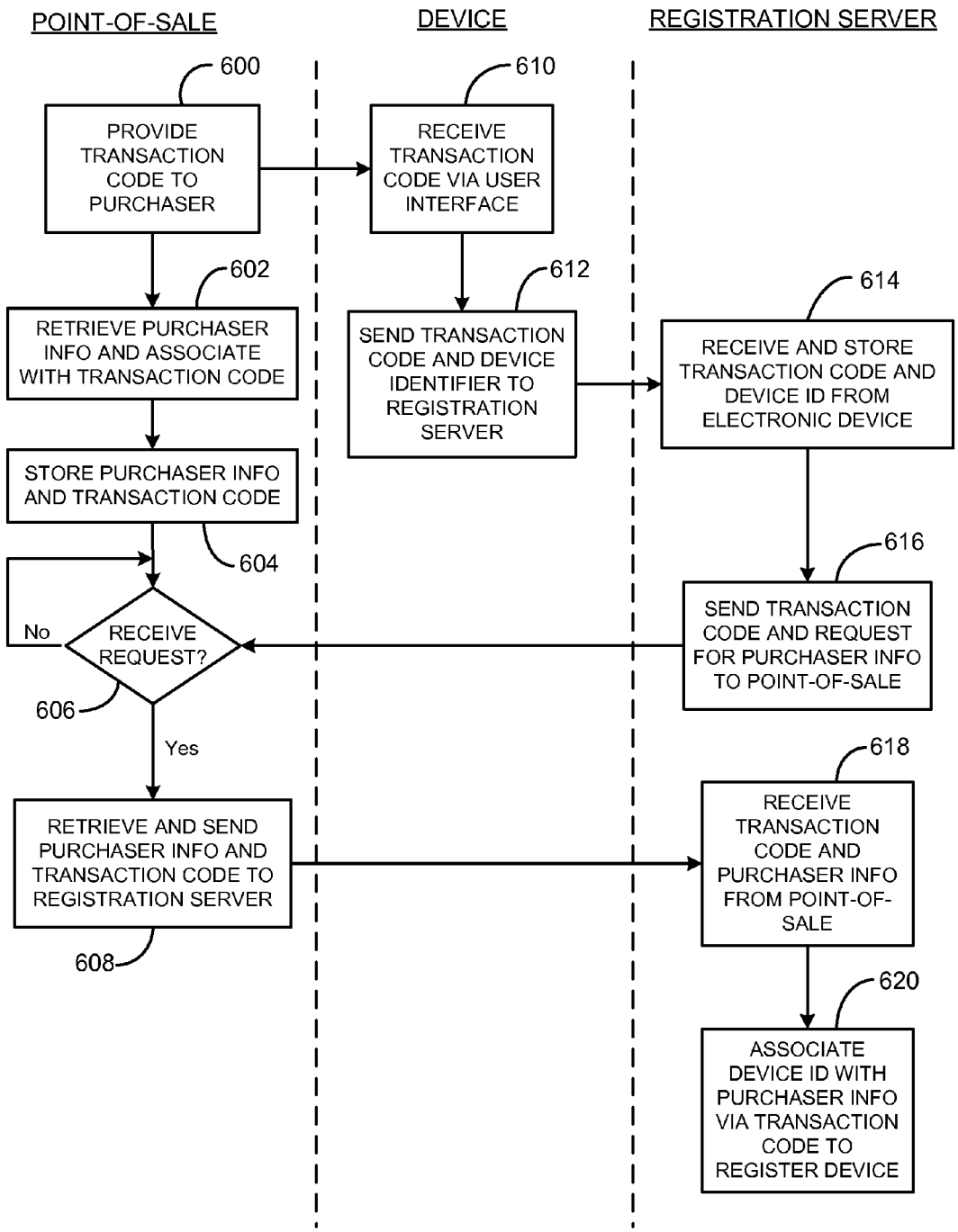
FIG. 6 is a block diagram illustrating an exemplary retailer according to another exemplary embodiment.

FIG. 6 is a flow diagram illustrating a process for registering an electronic device according to another exemplary embodiment. In this embodiment, the POS 200 provides the transaction code 222 to the purchaser 310 in connection with the purchase (block 600), retrieves or collects purchaser information 252 from the information provider 250 and associates the purchaser information 252 with the transaction code 222 (block 602). Instead of sending the purchaser information 252 with the transaction code 222 to the registration server system 400 in connection with the purchase, however, the POS 200 stores the transaction code/purchaser information pair 232 in memory 220 (block 604), and waits for a request 450 for the purchaser information 252 from the registration server system 400 (block 606).

In the meantime, the purchaser 310 has received the transaction code 222 in connection with the purchase. When the purchaser 310 wishes to register the electronic device 300, the purchaser can enter the transaction code 222 into the electronic device 300 via the user interface 312. Accordingly, at the device, the transaction code 222 is received via the user interface 312 (block 610). After the purchaser 310 enters the transaction code 222, the device correlator component 330 can automatically retrieve the device identifier 322 from the storage mechanism 320 and send the transaction code 222 and the device identifier 322 to the registration server system 400 via the network 110 (block 612).

According to this exemplary embodiment, at the registration server system 400, the server 410 receives and stores the transaction code/device identifier pair 332 (block 614), and sends a request 450 that includes the transaction code 222 for the purchaser information 252 associated with the transaction code 222 to the POS 200 (block 616). In this embodiment, the transaction code 222 can include a prefix that identifies the POS 200 and its location. When the POS receives the request 450 (block 606), the POS 200 retrieves and sends the transaction code/purchaser information pair 232 to the registration server system 400 (block 608).

When the registration server system 400 receives the transaction code/purchaser information pair 232 from the POS 200 (block 618), it retrieves the corresponding transaction code/device identifier 232 pair from storage 420 and associates the device identifier 322 with the purchaser information 252 to register the device 300 (block 620). In this manner, the purchaser information 252 is not released to the registration server system 400 until the purchaser 310 elects to register the electronic device 300, thereby protecting the purchaser's privacy.

The executable instructions of a computer program as illustrated in FIG. 5 and FIG. 6 can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used here, a "computer readable medium" can be any means that can contain, store, communicate, propagate, or transport the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium.

More specific examples (a non-exhaustive list) of the computer readable medium can include the following: a wired network connection and associated transmission medium, such as an ETHERNET transmission system, a wireless network connection and associated transmission medium, such as an IEEE 802.11(a), (b), or (g) or a BLUETOOTH transmission system, a wide-area network (WAN), a local-area network (LAN), the Internet, an intranet, a portable computer diskette, a random access memory (RAM), a read only memory (ROM), an erasable programmable read only memory (EPROM or Flash memory), an optical fiber, a portable compact disc (CD), a portable digital video disc (DVD), and the like.

According to the exemplary embodiments, a registration server system 400 uses a transaction code 222 to correlate an electronic device 300 with a purchaser 310 to register the electronic device 300. The transaction code 222 is associated with a purchase of an electronic device 300 and does not uniquely identify the electronic device purchased. The purchaser 310 receives the transaction code 222 from the POS 200 in connection with the purchase, and when prompted, can enter it into the electronic device 300. The electronic device 300 is configured to receive the transaction code 222 and send the transaction code 222 and its device identifier 322 automatically to the registration server system 400. In the meantime, the POS 200 is configured to associate the transaction code 222 with purchaser information 252 and to send the transaction code 222 and purchaser information 252 to the registration server system 400. The registration server system 400 uses the transaction code 222 to correlate the device identifier 322 with the purchaser information 252 to register the electronic device 300.

According to the exemplary embodiments, the purchaser 310 is not required to provide any information other than the transaction code 222 to the registration server system 400. Thus, the registration process takes little time and effort on the part of the purchaser 310, thereby motivating the purchaser 310 to register the device 300. The effort by the POS 200 is also minimal because the POS 200 ordinarily collects the purchaser information 252 as a normal part of the business transaction. Thus, the POS 200 does not suffer by supporting the registration process. Overall, because the registration process is simplified for both the POS 200 and purchaser 310, more purchasers 310 will be encouraged to register their devices 300.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for registering an electronic device, the method comprising
   receiving a transaction code associated with a purchase of an electronic device that does not uniquely identify the electronic device;
   creating a registration message including the transaction code and a device identifier uniquely identifying the electronic device, the registration message configured to initiate a registration process including associating purchaser information with the device identifier based on the transaction code to register the electronic device; and
   sending the registration message to a registration server system via a network, wherein purchaser information is associated with the device identifier based on the transaction code to register the electronic device.

2. The method of claim 1 wherein receiving the transaction code includes providing a user interface for receiving the transaction code in the electronic device.

3. The method of claim 2 wherein providing the user interface includes prompting the purchaser to enter the transaction code via the user interface during a device activation process.

4. The method of claim 2 wherein providing the user interface includes prompting the purchaser to enter the transaction code periodically until the transaction code is received.

5. The method of claim 2 further comprising limiting operation of the device until the transaction code is received.

6. The method of claim 1 wherein the device identifier is stored in the electronic device.

7. An electronic device comprising:
   a user interface for receiving a transaction code associated with a purchase of an electronic device that does not uniquely identify the electronic device;
   a device correlator component configured to create a registration message including the transaction code and a device identifier uniquely identifying the electronic device, the registration message configured to initiate a registration process including associating purchaser information with the device identifier based on the transaction code to register the electronic device; and
   a communication interface for sending the registration message to a registration server system via a network, wherein purchaser information is associated with the device identifier based on the transaction code to register the electronic device.

8. The device of claim 7 wherein the user interface is configured to prompt the purchaser to enter the transaction code via the user interface during a device activation process.

9. The device of claim 7 wherein the user interface is configured to prompt the purchaser to enter the transaction code periodically until the transaction code is received.

10. The device of claim 7 the device correlator component is configured to limit operation of the device until the transaction code is received.

11. The device of claim 7 further comprising a storage mechanism for storing the device identifier, wherein the device correlator component is configured to retrieve the device identifier from the storage mechanism.

12. A computer readable medium containing program instructions for allowing a purchaser to register an electronic device, the program instructions for:

receiving a transaction code associated with a purchase of an electronic device that does not uniquely identify the electronic device;

creating a registration message including the transaction code and a device identifier uniquely identifying the electronic device, the registration message configured to initiate a registration process including associating purchaser information with the device identifier based on the transaction code to register the electronic device; and sending the registration message to the registration server system via a network, wherein purchaser information is associated with the device identifier based on the transaction code to register the electronic device.

13. A method for registering an electronic device, the method comprising:

receiving a transaction code and purchaser information associated with a purchase of an electronic device, wherein the transaction code does not uniquely identify the electronic device purchased;

receiving, from the electronic device, the transaction code and a device identifier uniquely identifying the electronic device; and registering the electronic device by associating the purchaser information with the device identifier via the transaction code.

14. The method of claim 13 wherein receiving the transaction code includes receiving a message including the transaction code and the purchaser information over a network.

15. The method of claim 13 wherein receiving the transaction code from the electronic device includes receiving a message including the transaction code and the device identifier over a network.

16. The method of claim 13 wherein the transaction code and purchaser information are received from a point-of-sale interface.

17. A system for registering an electronic device, the system comprising:

a server including:

a network interface for communicating over a network; and a registration service module configured to receive a transaction code and purchaser information associated with a purchase of an electronic device, wherein the transaction code does not uniquely identify the electronic device purchased, to receive from the electronic device the transaction code and a device identifier uniquely identifying the electronic device, and to register the electronic device by associating the purchaser information with the device identifier via the transaction code.

18. The system of claim 17 wherein the transaction code and purchaser information are received from a point-of-sale interface.

19. A computer readable medium containing program instructions for allowing a purchaser to register an electronic device, the program instructions for:

receiving a transaction code and purchaser information associated with a purchase of an electronic device, wherein the transaction code does not uniquely identify the electronic device purchased;

receiving, from the electronic device, the transaction code and a device identifier uniquely identifying the electronic device; and registering the electronic device by associating the purchaser information with the device identifier via the transaction code.

20. The system of claim 19 wherein the transaction code and purchaser information are received from a point-of-sale interface.

* * * * *